June 27, 1967  G. E. KEEFER  3,328,149
GLASS MELTING FURNACE
Filed July 26, 1963  8 Sheets-Sheet 7
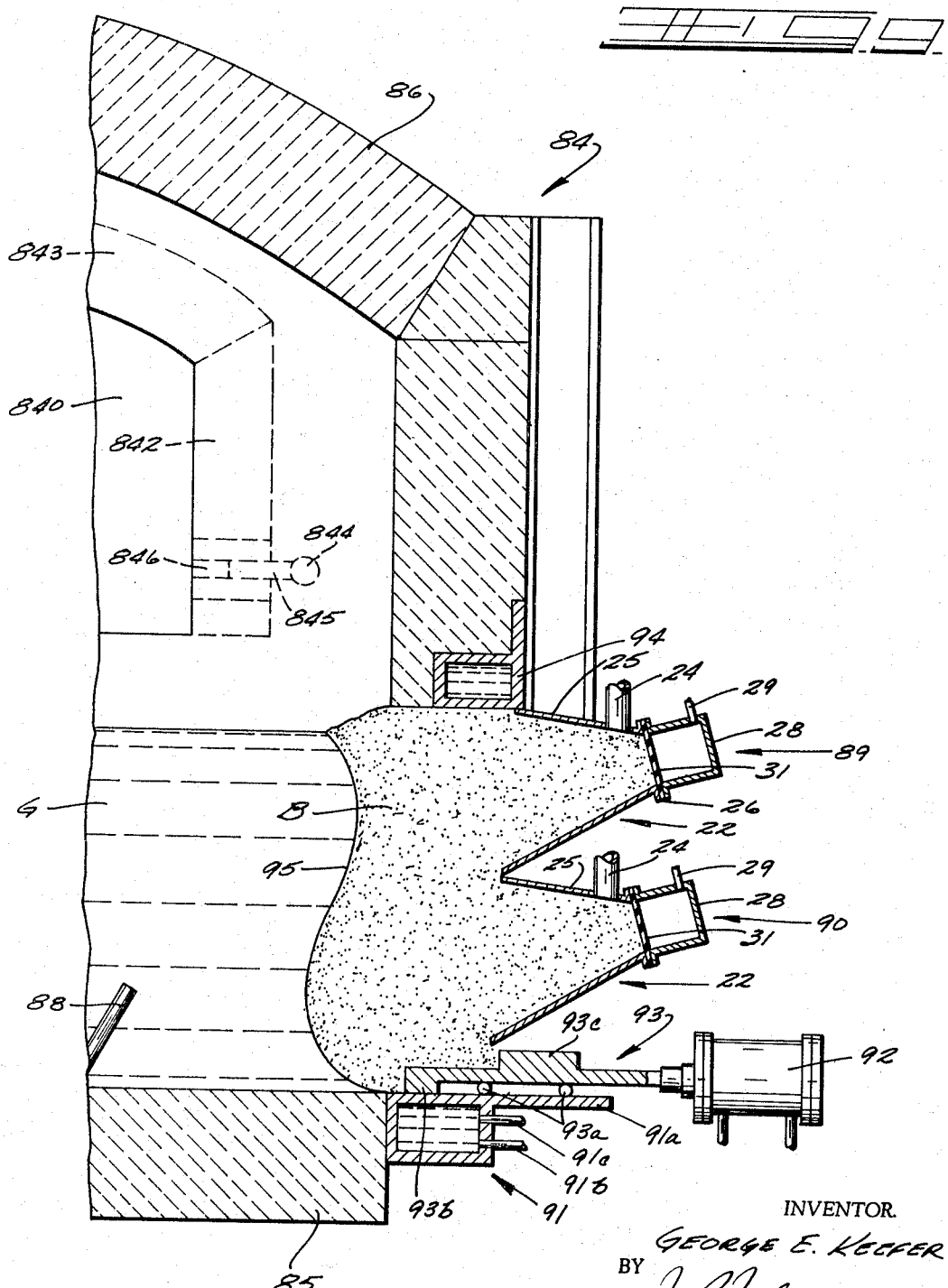
INVENTOR.
GEORGE E. KEEFER
BY
J. R. Nelson
and W. A. Schaich
ATTORNEYS

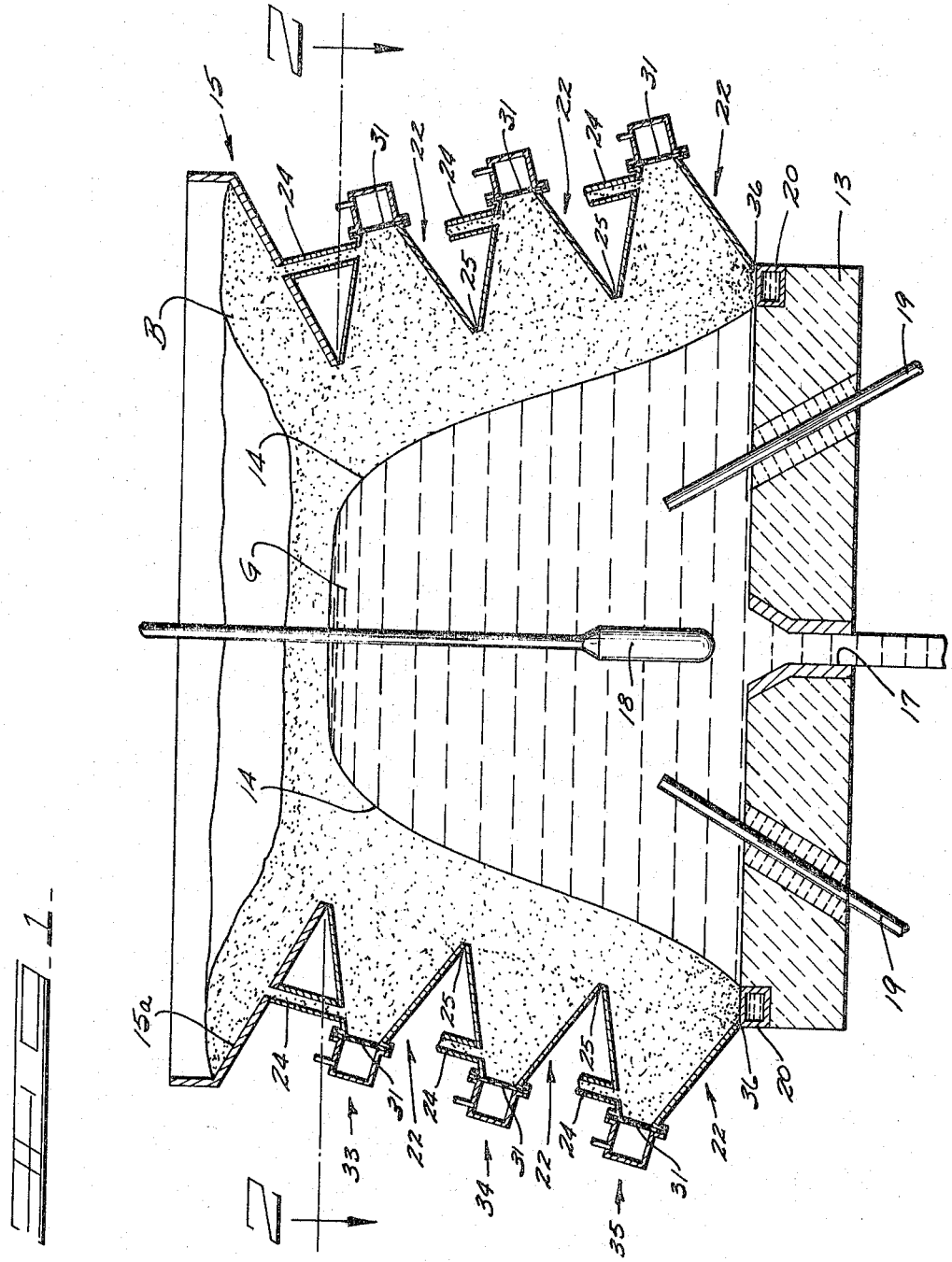

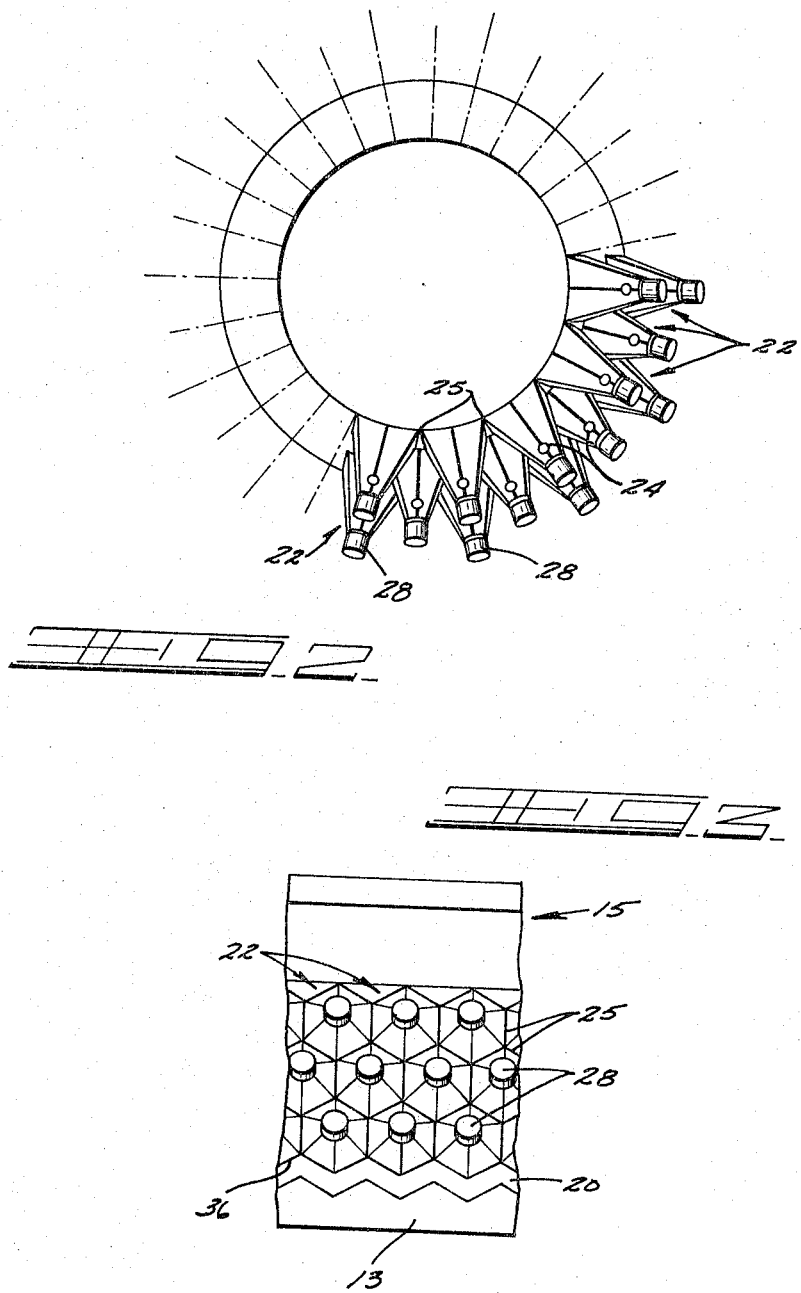

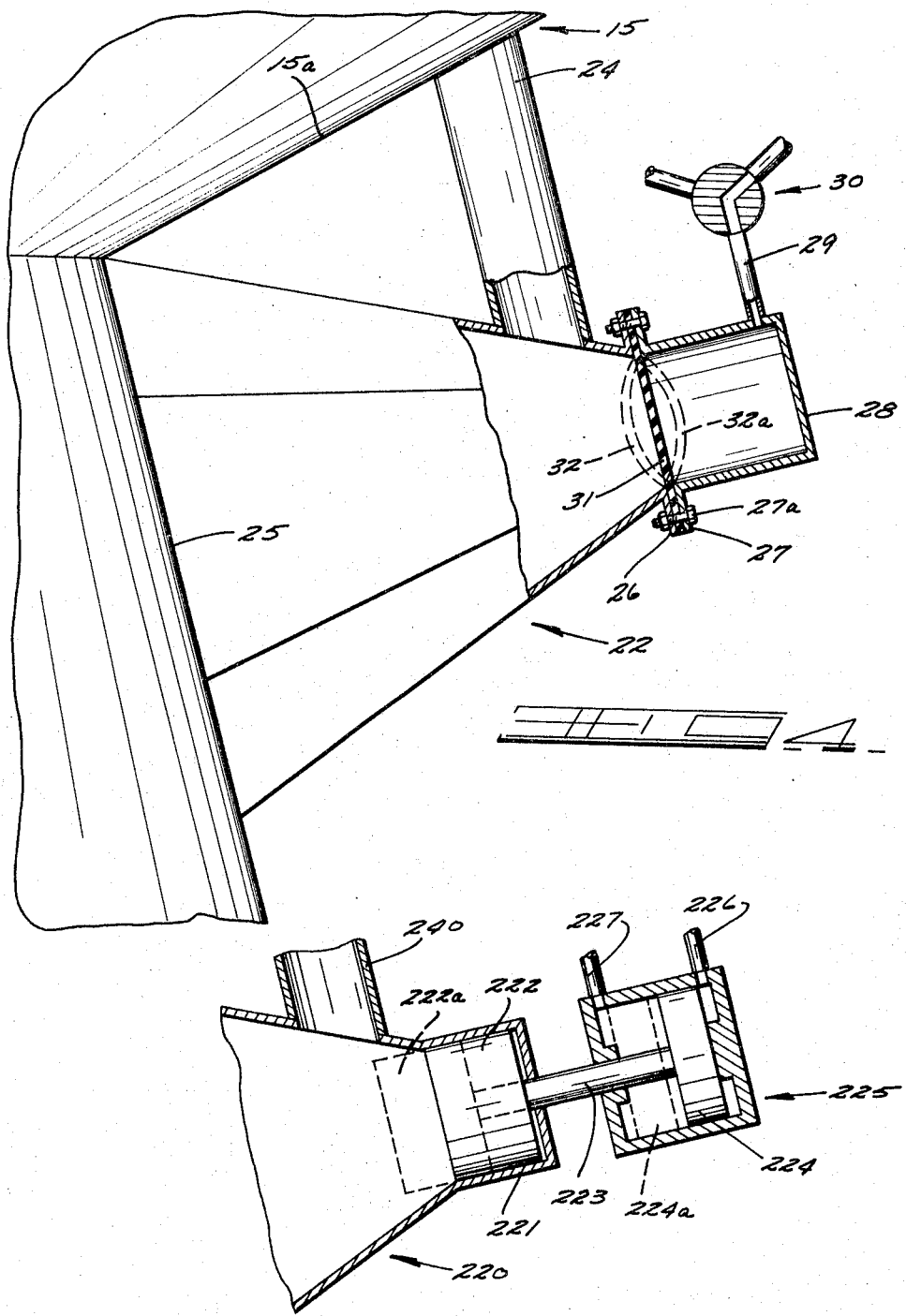

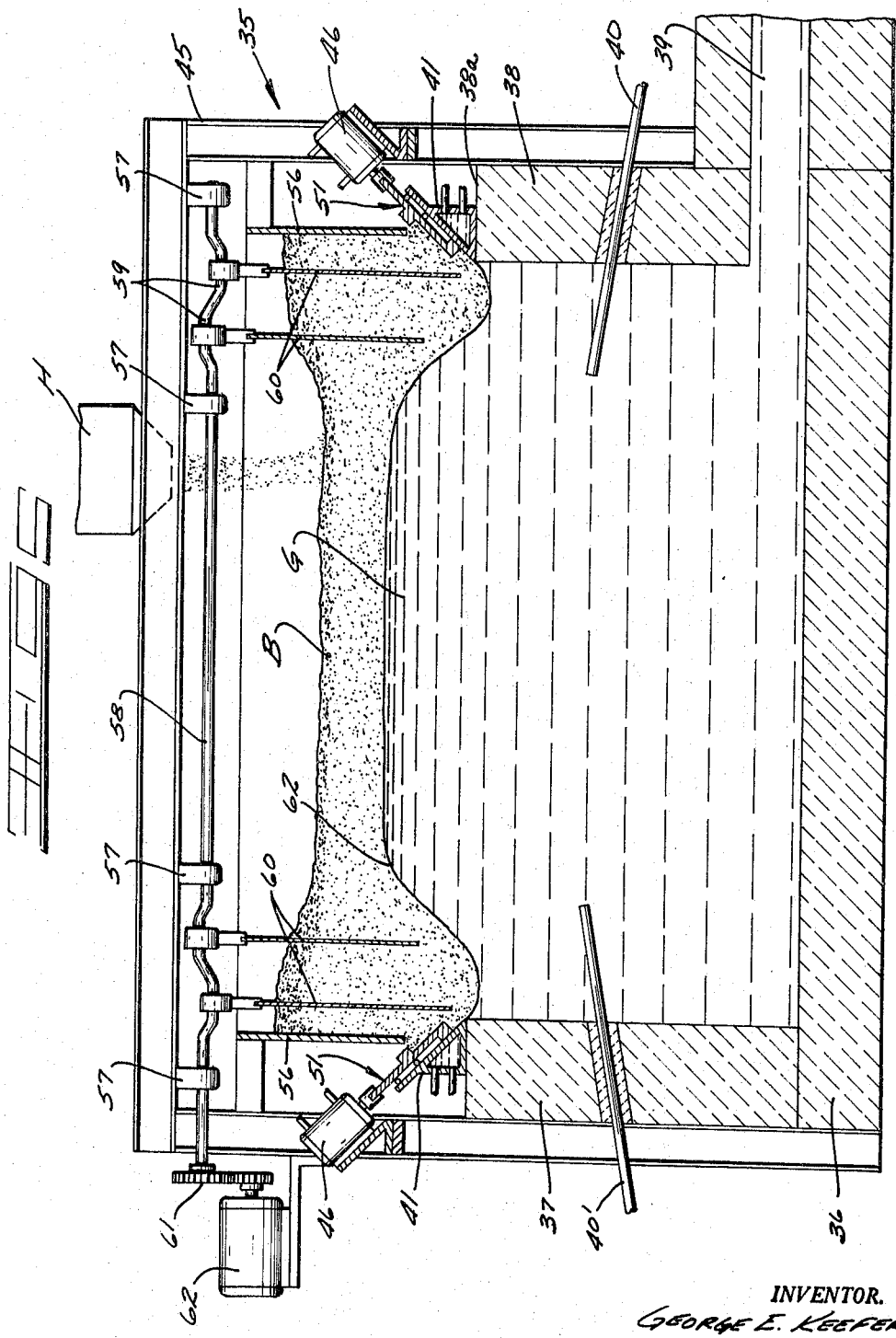

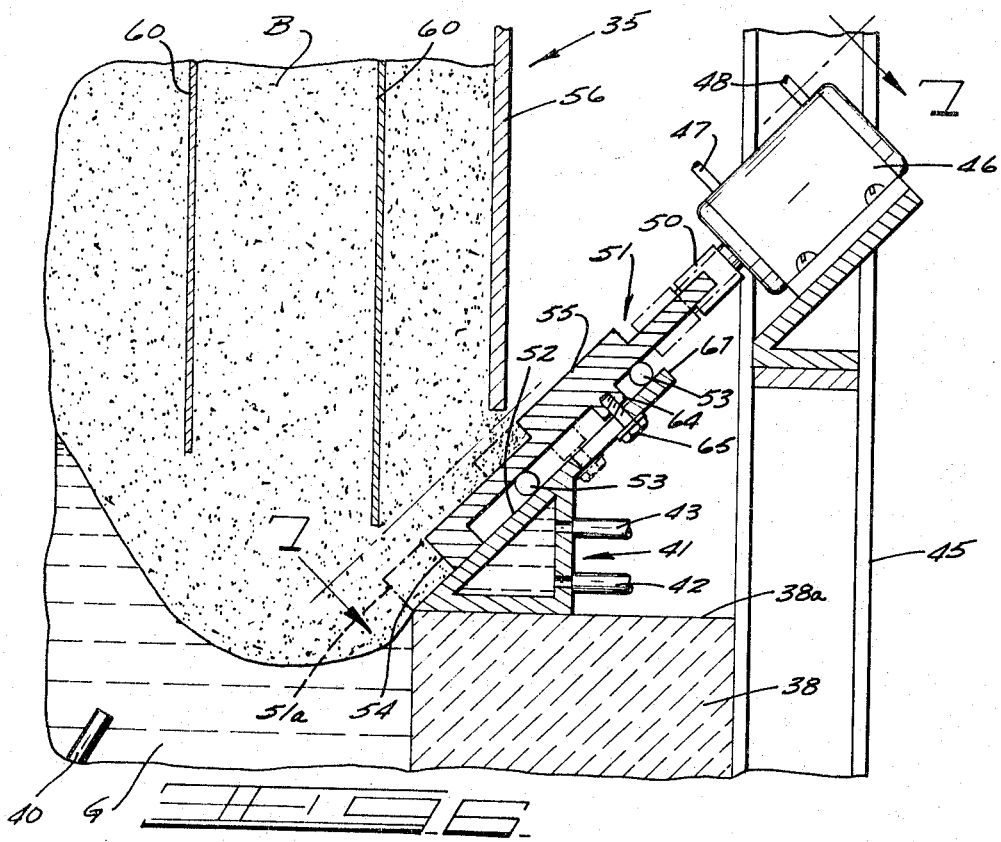
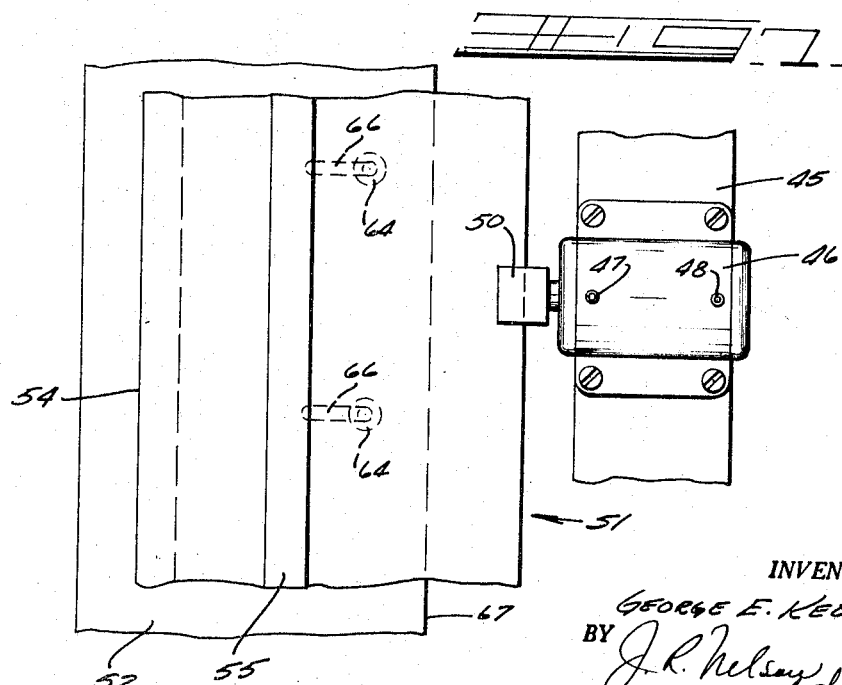

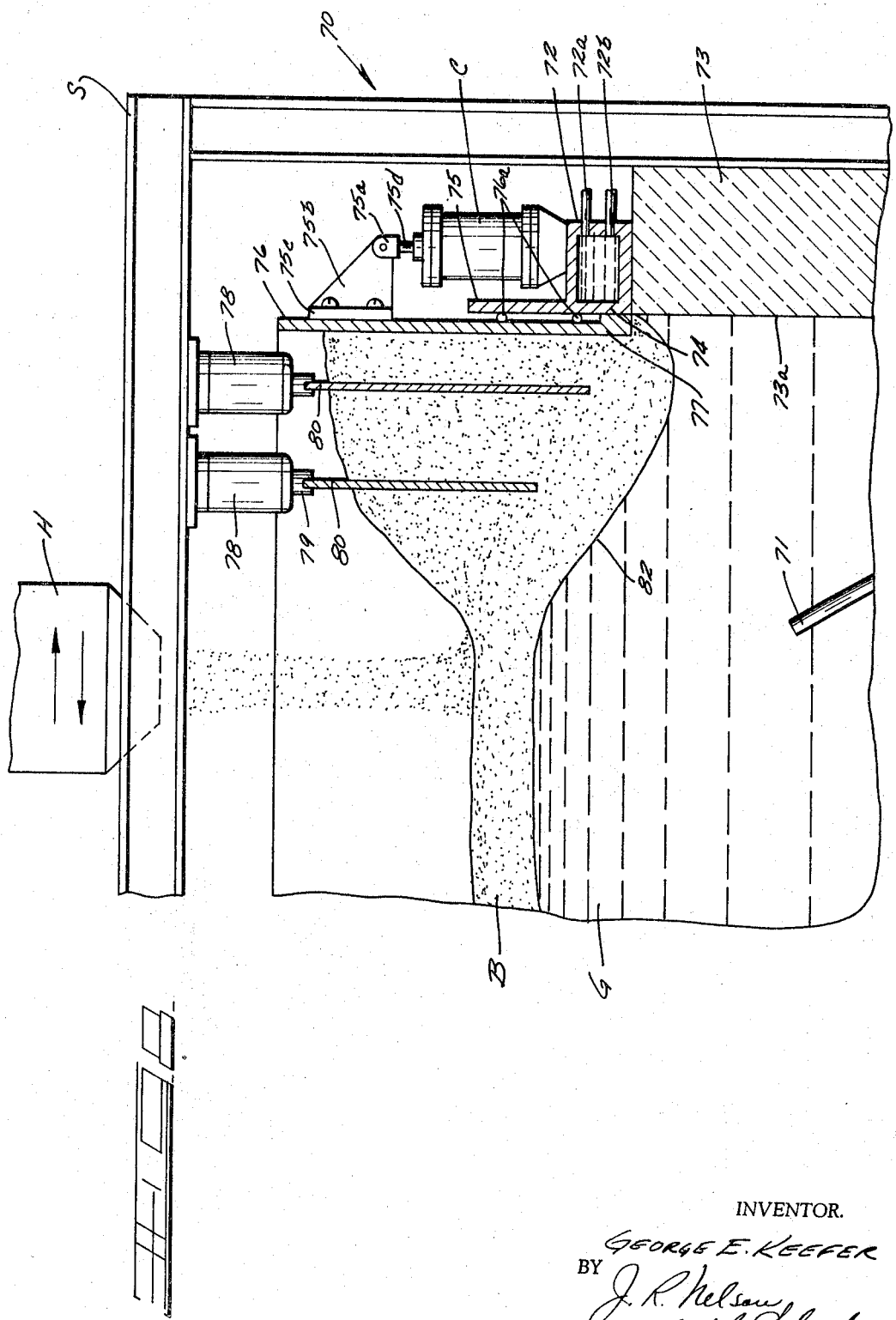

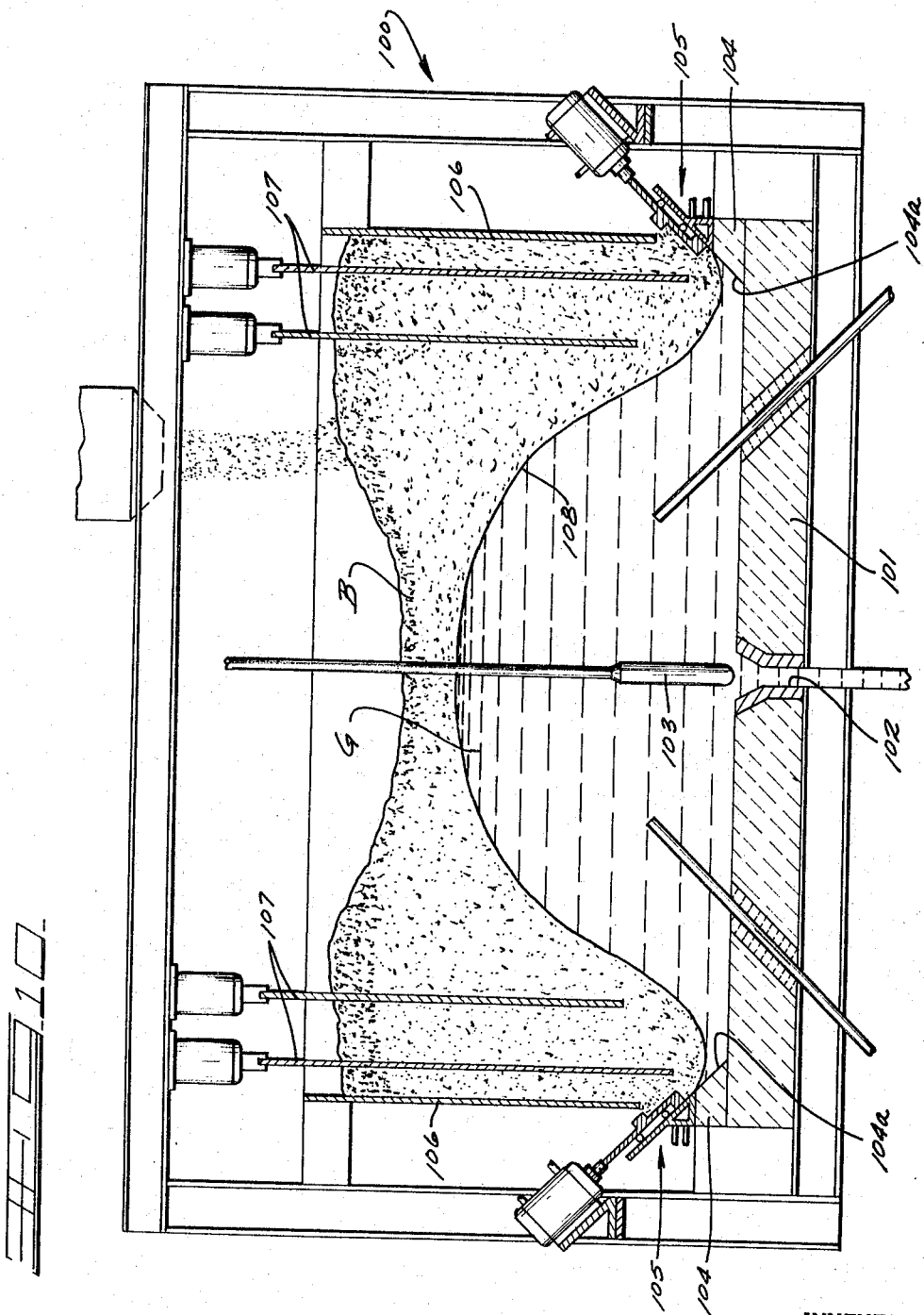

ingredients in a region upwardly along the furnace wall, creating in effect an upwardly creeping level of molten glass, wetting and eroding away the refractory wall of the furnace.

It is a particular feature of the present invention to make provisions for controlling and manipulating the level of the molten liquid within the furnace enclosure and, at the same time, controlling or manipulating the movement of the glass-forming batch ingredients such that the difficulties enumerated hereinabove are to a large extent overcome. By this combination of control, it is found that the batch ingredients can be moved inwardly and downwardly to break up the heat conductivity pattern referred to hereinbefore, which is otherwise conducive to the erosion problems and heat loss problems mentioned previously.

It is a particular feature of the present invention that the glass-forming batch ingredients are forced into the melting zone against the hydrostatic head of previously melted liquid glass. In this fashion, the side wall area necessary to enclose and contain the contents of the furnace is substantially reduced or in fact eliminated. As a consequence, many of the problems mentioned hereinbefore are obviated and, at the same time, the furnace life is increased and construction and maintenance costs are reduced.

With the foregoing general introduction, it may be stated that it is an object of the present invention to provide a method of operating glass furnaces which overcomes the difficulties hereinabove enumerated and, at the same time, to provide new and novel glass melting furnaces which are not beset with these problems and difficulties.

It is also an object of the present invention to provide a novel furnace construction which permits utilization of glass-forming ingredients or unmelted batch as a structural and load supporting part of the glass melting furnace.

It is yet another object of the present invention to provide a furnace construction which is so designed that the level of the molten glass within the furnace is capable of efficient control, particularly at the marginal portions where, normally, contact with the side wall occurs.

It is another object of the present invention to provide a furnace construction and melting method which is capable of producing a fused glass melt possessed of a much lower level of defects or contaminants, such as stones, striae, and the like, than possible heretofore.

The foregoing, as well as other objects of the present invention, will become apparent to those skilled in the art from the following detailed description taken in conjunction with the annexed sheets of drawings on which there is presented, for purposes of illustration only, several embodiments of the present invention.

In the drawings:

FIG. 1 is a vertical sectional view, partially broken, of a glass melting furnace constructed in accordance with a preferred embodiment of the present invention.

FIG. 2 is a sectional view taken on the line 2—2 of FIG. 1.

FIG. 3 is a partial side elevation view of a segment of the furnace construction shown in FIGS. 1 and 2.

FIG. 4 is a partially broken away, side elevation view, greatly enlarged, of one segment of the construction constituting the restraining side wall member of the furnace in accordance with the preferred embodiment generally shown in FIGS. 1-3.

FIG. 4a is a view generally similar to that of FIG. 4 but illustrating a mechanical arrangement which may be substituted for the pneumatic element as shown in FIG. 4.

FIG. 5 is a vertical sectional view of a glass melting furnace constructed in accordance with another embodiment of the present invention.

FIG. 6 is a greatly enlarged view of a portion of the side wall construction shown in FIG. 5, serving the purpose of more clearly illustrating the details of construction providing batch ingredient control.

FIG. 7 is a view taken on the line 7—7 of FIG. 6

FIG. 8 is a vertical sectional view of a furnace construction representing another embodiment of the present invention, in which view a portion has been broken away in order that the particular feature may be shown considerably enlarged.

FIG. 9 is a vertical sectional view of a furnace construction embodying somewhat of a variant of the feature of construction illustrated in FIG. 8.

FIG. 10 is a view generally similar to FIGS. 1 and 5, namely, a vertical section of the glass melting furnace, but illustrating features of construction representing a still further embodiment of the present invention.

Viewed in its most simple light, the present invention envisions an operation for the melting of a solid, say for example, glass-forming batch ingredients, to a molten state wherein the level of the molten glass is controlled by provisions permitting manipulation of the batch in its introduction to the enclosure. More specifically, the invention envisions a forceful urgment of granular batch materials in a downward and inward dirction as introduced in the region, constituting the peripheral portions of the furnace enclosure or melting zone, whereby the mass of molten glass centrally located in the furnace enclosure is urged upwardly against the normal liquid level of the molten glass. In addition to the foregoing, the invention makes particular provisions for fixing the depth of the molten glass at the peripheral regions of the furnace enclosure by utilizing a barrier above which the molten glass will not rise.

It will be appreciated that a number of techniques and a variety of constructional features may be employed to accomplish the controlled physical relationship and manipulation of the solid batch ingredients and the molten glass. A few preferred construction features embodied in glass melting furnaces are disclosed in the accompanying drawings, to which reference will now be had in order to provide those skilled in the art with a ready understanding of the invention as required by the patent statutes.

There is disclosed a particularly preferred furnace construction in FIGS. 1–4. As can be seen by reference to FIG. 1, a generally horizontal slab of refractory 13 supports a crown-shaped pool of molten glass G about which is situated a constantly replenished supply of granular, glass-forming ingredients B, commonly referred to as batch. The crown contour of the molten glass is identified by the reference numeral 14. The granular batch B proceeds or is supplied by gravity from an overhead hopper 15 (FIG. 4). The hopper 15 preferably has downwardly and inwardly sloping side walls 15a. The slab forming the bottom wall 13 contains a central outlet orifice 17 from which the molten glass may proceed when the plunger 18 is in its upper position as shown. The plunger is vertically shiftable so that the outlet 17 can be closed. Heat is supplied to the molten glass by the electrodes 19 which proceed angularly up through the bottom wall. A hollow conduit 20 is inset at the upper peripheral edge of the refractory slab 13 forming the bottom wall. A suitable coolant, such as water, is circulated in conduit 20. This fixes the boundary of the molten glass in a lateral direction. Instead of a side wall as in a conventional furnace, there is employed a honeycomb-like, closed array or network of hollow, cone-like cells 22 situated about and above the outer periphery of the bottom wall. The network includes, in this case, three rows of the edge-connected cells 22. The term "honeycomb" as used herein and the appended claims is to be interpreted as descriptive of the general construction involving a plurality of similarly configured elements. The term is particularly apt in considering the appearance in elevation as shown in FIG. 3. The term is not used in a limitative sense but as generically descriptive of a principal constructional feature of the invention. The larger ends of these cells 22 are filled with batch material as supplied by individual inlet tubes 24. The cone-like cells are situated, with respect to the molten glass, so that their major bases face inwardly with respect to the molten glass G and their principal axis is amide in a slightly downwardly direction. The edges 25 of the cones are connected, as shown, to cells of identical construction on all sides. As can be seen by particular reference to FIGS. 2 and 3, in this embodiment, the cones are constructed so that the major base of each describes a hexagon, although it is to be understood that this particular arrangement is disclosed for purposes of illustration only.

One of the cells 22 is shown greatly enlarged in FIG. 4. The particular cell shown in this FIG. 4 is located in the upper row 33 of cells, of which there are three (33, 34 and 35), as illustrated in FIG. 1. The cone-shaped cell 22 is truncated as at 25 and has a flange 26 formed thereon to which is bolted a flanged, hollow cylindrical end cap member 28. The cap 28 is connected by a conduit 29 to a valve arrangement 30, which, as shown schematically in FIG. 4, permits the hollow interior of cap 28 to be selectively connected with either a vacuum source or a pressure source. The cell 22 further includes a flexible, resilient diaphragm element 31 which is secured between the flange end 26 of the cone and matching flange 27 of the cap membre 28 and is held there securely by the bolt and nut arrangement 27a, as shown. By reason of the construction as described, the diaphragm 31 can be shifted positively to and fro between the position shown in full line and the positions shown in dotted line, identified by the reference numerals 32 and 32a. The frequency of shifting, of course, depends on the operation of control valve 30, which, as indicated, controls either a condition of pressure or vacuum within the cap member 28. The oscillatory movement of the diaphragm 31 transmits a force or urgement of granular batch ingredients (not shown in FIG. 4) immediately contiguous thereto, and this force or urgement is transmitted progressively inwardly and downwardly (with respect to the interior) by reason of the inclination of the network of cells, as shown in FIG. 1. Thus, the upper row 33 of cone-like cells is inwardly displaced towards the center of the furnace, as compared to the next lower row 34, and the latter in turn is displaced inwardly in turn to the lowermost row 35. The bottom edges 36 of cells in row 35 are in sealing contact with the upper, outer peripheral edge of the hollow member 20 forming the chilling surface at the bottom wall of the furnace.

In operation, the dry granular glass batch B is continuously supplied as needed from the hopper 15 and proceeding through conduits 24 to the interior of the cone-like cells 22. The latter are activated individually or in preselected sets chosen to give a balanced inward and downward urgement. As a consequence, the molten glass is likewise moved inwardly and also upwardly, thereby providing the desired control of the location and contour of the interface between the molten glass and the blanket of batch thereabove. Suitable control of the diaphragm elements in concert permits considerable variance of the contour of the contact line between the molten glass and the granular batch. It can be seen, by reference to FIG. 1, that the contour line, identified by the reference numeral 14, in effect represents a thermally effective conically-shaped melting area. In conventional furnaces, the melting area is in effect a horizontal plane corresponding to the horizontal cross sectional area of the furnace construction proper. It will be appreciated that the present invention permits a saving of a considerable amount of refractory block elements, since only a bottom wall of refractory block is necessary. Furthermore, the area of the furnace construction in accordance with this invention includes an even greater effective melting area than would normally be expected by reason of the provided controlled increase in the contour line between molten glass and dry batch.

Reference may be had to FIG. 4a for an alternative construction for inducing movement of batch glass forming ingredients. In this embodiment the cone shaped cell 220 has a vertical feed pipe 240 connecting therewith for furnishing supply of batch materials as needed. The outer end of the cone member 220 is formed into a cylinder 221 having axially and slidably mounted therein a piston member 222. A shaft 223 connects the piston 222 with spaced piston 224 reciprocably mounted in a cylindrical hydraulic motor 225. This motor is equipped with opposite end ports 226 and 227 for appropriate introduction of pressure or exhaustion providing driving force for the piston 224. The latter motion is translated via the shaft 223 to the piston member 222 which thereby oscillates between the position shown in full outline 222 and the position shown in dotted outline 222a. The piston 224 likewise oscillates between full line position 224 and that shown in dotted outline 224a. As a result, the movement of batch is effected in a similar manner as in the case of the diaphragm 32 in the embodiment shown in FIG. 4.

Reference may now be had to FIGS. 5–7, wherein a furnace 35 representing a slightly variant construction is shown. The furnace 35 is composed of a horizontal bottom wall 36 formed of refractory and spaced upstanding side walls 37 and 38 likewise formed of a refractory which is insulative in character. The end walls connecting the side walls are not shown. The furnace includes a lateral outlet channel 39 for molten glass. Heat is furnished by means of opposed electrodes 40 and 40' proceeding interiorly through the side walls of the furnace. Since circuitry for accomplishing electric heating is well known, such need not be disclosed in the present description. In accordance with this embodiment of the present invention, the upper edge 38a of the side (and end) wall has located thereon a conduit 41 which is hollow and of generally triangular configuration in section. The conduit includes an inlet 42 and an outlet 43 for introducing and withdrawing an appropriate coolant, e.g., water or the like. A superstructure 45, as shown, supports an air cylinder 46, inclusive of an air inlet 47 and an air outlet 48 for effecting reciprocation of a shaft terminating in yoke member 50 which holds a scraper plate 51, preferably adapted to be in abrading contact with the inclined upper surface 52 of the cooling conduit. The scraper plate element, as can be seen by reference to FIG. 6, alternates between the position (51) shown in full line and the position (51a) shown in dotted line. The scraper rides on bearings 53 and includes a forward pusher end 54. The scraper blade also includes an upper projection 55. The frequency and length of stroke of the scraper blade 51 can be varied by appropriate control of the air cylinder 46. This latter operation is purely mechanical and within the skill of the art and need not be explained in detail. The structural details of the scraper element 51 and its connection to the angular surface of the cooling conduit 41 is best shown in FIGS. 6 and 7. A boss 64 formed on the underside of the scraper includes a threaded hole engaged by a threaded bolt 65 which extends through an elongated slot 66 formed in the upwardly extending extension 67 formed on the scraper. The bolt is adjusted so that the scraper slides easily on the bearings 53 in order that the intended function is accomplished. The superstructure 45 also supports a restraining wall 56 which guides the supply of granular glass-forming batch materials B dropped, as shown, from a supply hopper H which is supported, although not shown, for reciprocable to and fro travel over the furnace to provide the batch materials as needed. The superstructure also supports depending journaled mounts 57 which rotatably support an overhead, horizontal crankshaft 58 having offset eccentric segments 59. The latter have journally connected thereto depending plates or bars 60 which extend downwardly into the batch. The crankshaft 58 is rotated by a gear train 61 driven by a motor 62, whereupon the plates 60 reciprocate vertically in alternate fashion, serving thereby to downwardly compact the batch material proximate the side wall. At the same time, the batch is maintained at a somewhat higher level at the side wall area than in the central portion of the furnace.

In operation, the scraper bar 51, reciprocably actuated by the air cylinder 46, urges the peripherally located batch material downwardly and inwardly by the contact thereof with the pusher end 54 and the upper projection 55. This is accentuated by the shifting movement of the overhead blades 60. At the same time, the cooling conduit 41 serves to fix the level of molten glass G at the side wall. Thus, the molten glass is prevented from proceeding upwardly beyond the conduit 41, by reason of the coolant inside which causes the molten glass to reach a highly viscous state as it nears the conduit. This highly viscous glass is continuously urged inwardly with respect to the furnace proper by reciprocation of the scraper element 51. The conjoint operation of the elements and features of construction as described above effects the formation and maintenance of an interface between the molten glass and the granular batch, which interface has the contour approximately as shown in FIG. 5 and identified by the reference numeral 62. The advantages attendant this contour line control has been previously alluded to and need not be repeated.

It is not essential, of course, for the scraper element to actually abradingly contact the upper surface 62. As a practical matter, the glass in a molten state rarely, if ever, solidifies on the coolant carrying conduit 41 or its angular surface 52. Rather, the temperature profile is such that the heat of the molten glass G is insufficient to melt the batch B in contact with the conduit. Thus, sort of an equilibrium condition exists between the temperature of the glass and the coolant wherein batch is not melted and the scraper 51 simply urges the batch downwardly and inwardly into the molten glass zone. If, on the other hand, the molten glass level should rise from that shown in FIG. 5 so that it would momentarily be in contact with the conduit 41, then it would solidifiy and be scraped away on the next cycle of the scraper 51.

Reference may now be had to FIG. 8, wherein there is disclosed a furnace 70 similar to the furnace 35 disclosed in FIGS. 5–7, but having certain structural modifications as described below. Only the upper right side portion of the furnace containing this embodiment is shown in FIG. 8 for purposes of simplicity. As in the furnace 35, an electrode 71 extends interiorly of the furnace 70 to provide heat for melting the batch ingredients B to a molten condition G. Overhead hopper H supplies batch as needed and preferably concentrates delivery at the side wall region as shown. In this embodiment, a hollow conduit 72 of rectangular configuration in section is situated on the upper edge of the side wall 73. An inlet 72a and an outlet 72b lead to the hollow interior permitting introduction and withdrawal of appropriate coolant, e.g., water. The conduit 72 is located so that the surface of vertical wall 74 constitutes a flush extension of the side wall inner surface 73a. Wall 74 includes an extension portion 75 proceeding vertically upwardly. An air cylinder C is situated on top of the conduit 72 and the vertically reciprocable shaft 75d thereof is connected, as shown, to a scraper plate 76 by a suitable yoke 75a and connecting plate arrangement 75b, the flange 75c of which is bolted to the scraper plate 76. The scraper plate 76 is vertically situated and includes a scraper head 77 adapted to preferably abradingly contact the inner surface of the conduit wall 74 and extension 75. The scraper rides on bearings 76a, as shown, and is otherwise operated in much the same fashion as the scraper assembly, shown in FIGS. 5–7.

The superstructure S supports a pair of depending air cylinders 78 which terminate in a shaft and yoke member 79 which hold spaced plates 80 projecting into the batch concentrated at the side wall region. Actuation of the air cylinders 78 causes vertical reciprocation of the plates 80, effecting flow of the batch ingredients B supplied by the laterally traversing hopper H. The operation of the furnace construction just described is generally similar to that of the embodiment illustrated in FIGS. 5–7, excepting that the scraper 76 is vertically disposed and also serves as a batch-restraining wall, thereby replacing wall 56 (FIG. 5).

In operation, glass batch at the peripheral portion proximate the side wall is urged downwardly by the conjoint cooperation of the reciprocable plate members 80 and the reciprocable scraper member 76. Contemporaneously, the coolant-containing conduit member 72 fixes the level of the molten glass G at the side wall, whereupon the interface 82 between the molten glass G and the glass batch B assumes the contour as shown, whereupon the thermal efficiency and the melting rate per area of furnace is greatly increased over conventional practice. At the same time, since the molten glass cannot creep continuously upwardly in the side wall region by reason of the cooling conduit, defects due to refractory impurities are substantially reduced. Preferably, as indicated hereinbefore, the batch ingredients are concentrated at the peripheral region near the side wall. The greater "head" of dry batch ingredients aids in forcing the molten glass upward in the central region of the furnace against the normal hydrostatic head.

Reference may now be had to FIG. 9, wherein there is disclosed another and preferred form of furnace construction in accordance with this invention. In this construction, a portion of the lower side wall is eliminated altogether and the batch feeding system similar to the embodiment shown in FIG. 1 is employed. The furnace 84 is defined by a horizontal slab of refractory 85, forming a bottom wall, and a crown-type top wall 86 having a depending peripheral side wall 87 which terminates short of the bottom wall. The furnace encloses a mass of molten glass G produced by heat which may be supplied alternatively as follows:

A burner port opening 840 is formed in the end wall 841 of the furnace. This burner port includes a side wall 842 and arch 843 connected to a regenerative checker chamber (not shown). A fuel such as natural gas or fuel oil is supplied through the pipe 844 into the burner nozzle 845 mounted in the lateral section 846 of the side wall 842, as shown in dotted outline in FIG. 9. The heated air supplied through the regenerative checkers into the end port 840 mixes with the fluid burner nozzle 845 to induce a combustible mixture into the melting chamber of the furnace 84. As an alternative, an electric boosting heat may be supplied by positioning electrodes such as 88 through the bottom refractory 85 at the bottom wall of the furnace and the electrodes submersed in the molten glass body so that the molten glass forms a resistance element of the electric heat circuit. These electrodes 88, which may be of known arrangement and number, are connected into a known electrical heating circuit (not shown). Along the sides of the furnace 84 and beneath the cooling conduit 94 are shown two tiers of cone-like cells indicated as 89 (the top tier) and 90 (the lower tier). As these cells 22 are constructed similar to the cells described under the embodiment of FIG. 1, the same reference numerals are here employed. The batch material is supplied to each of the cells 22 through vertical tubes 24 which connect onto the top tapered sides 25 of the flared cells. The truncated sides 25 of each of the sides has a flange 26 to which is bolted the hollow end cap member 28. This hollow cap member 28 is connected by a conduit 29 which extends to a valve arrangement, not shown but identical to that shown schematically in FIG. 4 and identified by the reference numeral 30. The valve arrangement is manipulated to selectively connect with a vacuum source or pressure source into the cylinder chamber of the cap member 28. The media, whether vacuum or pressure, will extend or distend a flexible diaphragm 31 so that the diaphragm shifts positively to and fro, thereby transmitting a force or urgement on the granular batch ingredients within the cell 25. This force is transmitted progressively inwardly and downwardly by each of the cells, that is the plural cells in each of the top tier 89 and the bottom tier 90 to feed and maintain a supply of the dry batch material in the side wall region 95. Thusly, the plural cells 22 serve to continuously supply granular batch material B. In the embodiment being described, there is additionally and preferably employed a hollow conduit 91 of rectangular cross section situated peripherally about the slab 85 with its upper surface in flush relationship with the upper surface of the slab and including an extension portion 91a. The conduit is provided with an inlet 91b and an outlet 91c for introduction and withdrawal of appropriate coolant, e.g., water or the like. An air cylinder 92 drives, in reciprocating horizontal fashion, a horizontally disposed scraper element 93 riding on bearings 93a and includes a scraper end 93b and an upper projection 93c, both of which serve to urge batch B inwardly to the left as the scraper moves in the direction of the molten glass. The furnace side wall 87 most ideally includes another hollow cooling conduit 94 in its lower edge terminus.

In operation, glass batch ingredients B are introduced into the interior of the furnace 84 via the tubes 24 and cells 22. The batch is continuously urged laterally inwardly against the mass of molten glass G by action of the scraper blade element 93 controlled by the cylinder 92 and also by the movement of the diaphragm elements 31 in each of the cells 22. The molten glass near the bottom slab 85 is confined in terms of its outward movement by reason of the cooling conduit member 91 and the cooperating scraper head 93b, the latter urging molten glass and batch proximate the upper surface of the slab and conduit 91 inwardly into the mass of glass G. The movement of the batch, as urged by the several coacting features of this particular construction, serves to define an interface between glass batch and the molten glass having the contour identified by the reference numeral 95. As indicated previously, in this embodiment the body of the glass-forming ingredients B by themselves constitute the glass retaining side wall of the furnace enclosure, whereupon there is no need of substantial refractory side wall in contact with molten glass. As a consequence, refractory impurities resulting in visible stones, striae, etc. are virtually eliminated.

Reference may now be had to FIG. 10, wherein there is disclosed in vertical section a glass melting furnace 100 incorporating variants of the batch-control and molten-glass interface control features of the previously disclosed embodiments. The furnace construction disclosed in FIG. 10 is quite similar to that shown in several of the other embodiments. Accordingly, a complete detailed description is not believed necessary. Accordingly, only those features which represent departures from that described hereinbefore will be described with particularity. The furnace 100 is inclusive of a bottom wall 101 having an orifice outlet 102 for molten glass, depending upon the position of the plunger element 103, shown here in the upper position. In this furnace, refractory side walls have been virtually eliminated by the employment of a single refractory block element 104 having an inner angular surface 104a. Upon this block is situated a cooling conduit and scraper assembly 105 which is identical to that shown in FIG. 6 and identified by reference numerals 41 and 51.

In operation, the granular batch ingredients are urged downwardly, both by the gravity induced by the higher batch level near the marginal batch restraining wall 106 and by the air cylinder-driven, reciprocable plate members 107, and also inwardly by action of the scraper element 105. By reason of the coaction of these constructional features, the central portion of molten glass is urged upwardly against its hydrastatic head to define a conical interface 108 between molten glass G and the granular batch B.

As a result, the area of melting or heat transfer is substantially increased over a conventional furnace construction of the same size wherein the melt area will correspond to a flat plane of the same area as that of the lateral span of the furnace.

As can be seen from the foregoing description, there has been provided a novel and unique furnace construction and a method of melting glass which is very much improved in yield and fuel efficiency per given area of floor space taken up. It can also be seen, particularly with respect to certain of the embodiments illustrated herewith, that the side wall, as ordinarily known, has been essentially replaced by utilizing the glass-forming ingredients themselves as the side wall. The thickness of the batch side wall can be adjusted and maintained as desired by appropriate hand manipulation or automatic control of the several coacting elements disclosed herein so that, consequently, any degree of insulation can be provided in accordance with the particular installation concerned. Even in the several embodiments wherein a side wall is utilized, it should be appreciated that when the furnace is operated in accordance with the techniques provided by this invention, the side wall need not be as high as normal and that, therefore, considerable savings in refractory block material is effected. Glass articles formed from glass melted in furnaces, constructed and operated in accordance with the foregoing, have been found to be noticeably free of seeds, stones and striae. This is explained by the fact that contact of refractory and molten glass has been substantially eliminated, particularly in the heretofore troublesome side wall region. As a consequence, refractory which is normally worn away does not find its way into the glass where it normally results in the aforesaid seeds, stones, striae and other defects. It will be apparent that the furnace efficiency, in accordance with the present invention, will be improved as compared to a conventionally operated and constructed furnace. In the latter, the glass level defines a horizontal plane, while the practice of the invention involving novel techniques and unique construction creates a crown-shaped area of contact between the batch-forming ingredients and the molten glass.

The herein description of the several embodiments of the present invention has been largely confined to the glass melting art. However, it is clear that the techniques, principles and features of construction involved are likewise applicable to the fusing and melting of other materials, including vitrifiable compositions of all kinds, plastics and resins, various inorganic salts, etc. In fact, the methods and apparatus basically disclosed herein will find some application in any industry wherein solid, usually granular, raw materials are charged to a furnace for conversion to a molten or liquid state prior to further processing, and particularly where relatively high temperatures are involved.

Modifications may be resorted to, without departing from the spirit and scope of the invention, as defined in the appended claims.

I claim:

1. A glass melting furnace including a bottom wall and a surrounding marginal wall of annular configuration, said walls defining a confined melting zone for glass-forming ingredients, said annular side wall extending convergingly upwardly and being composed of a plurality of cells arranged in generally honeycomb fashion, each of said cells including independently operable means effective to urge batch glass-forming ingredients inwardly and downwardly with respect to said zone, whereby molten glass melted and contained in said furnace is urged inwardly.

2. A furnace as claimed in claim 1, which includes a peripheral cooling conduit located at the juncture of said bottom wall and said side annular wall.

3. A melting furnace for glass and the like comprising a bottom wall and a surrounding enclosure wall which together define a melting zone for the ingredients to be melted, said enclosure wall including a plurality of cells arranged in honeycomb array, each cell being formed of a generally hollow cone-like shell, the larger open end of said shell facing inwardly and downwardly, said shell including a reciprocable element mounted for oscillating movement along the central axis of said shell, said shell including an entry opening for meltable ingredients generally between said element and said open end and means for actuating said element to urge ingredients out of said shell towards said melting zone.

4. A melting furnace as claimed in claim 3, wherein said reciprocable element is a diaphragm and said actuation means comprises a chamber of which the diaphragm is one wall, said chamber being connected to a variable pressure source whereby said diaphragm moves inwardly and outwardly responsive to fluid pressure to thereby urge meltable ingredients inwardly.

5. A melting furnace as claimed in claim 3, wherein said reciprocable element is a piston.

6. A glass melting furnace comprising a bottom wall, a peripheral margin member, conduit means for coolant located proximate said margin and coextensive therewith, said margin member having a surface contactible with molten glass formed in said furnace, scraper means adapted to reciprocatingly move across said surface and thereby keep said surface free of cooled glass tending to collect on said surface by reason of said coolant and delivery means for glass-forming ingredients adapted to hold and deliver to said furnace proximate said surface a quantity of said batch ingredients sufficient to depress the molten glass adjacent said margin member.

7. A glass melting furnace comprising a bottom wall, conduit means for coolant located proximate the outer margin of said bottom wall and coextensive therewith, scraper means constructed and arranged to reciprocatingly move across said marginal peripheral surface of said bottom wall and thereby keep said surface free of cooled glass tending to collect on said surface by reason of said cooling means, and means for maintaining a supply of glass-forming ingredients proximate said surface.

8. A glass melting furnace as claimed in claim 7, wherein said scraper means includes an integral projection adapted to contact said glass-forming ingredients and urge same inwardly with respect to said furnace.

9. A glass melting furnace as claimed in claim 7, wherein said conduit includes a surface in abutting planar relationship with said marginal surface, and said scraper means is constructed and arranged to reciprocate across both of said surfaces.

10. A glass melting furnace as claimed in claim 7, which includes a means for agitating said ingredients.

11. A glass melting furnace as claimed in claim 10, wherein said agitation means include at least two spaced elements suspended in batch ingredients and adapted for relative reciprocating motion to thereby urge ingredients therebetween in a downward direction.

12. Glass melting apparatus comprising a horizontal bottom wall, a chilling means along said bottom wall, scraper means selectively driven to abradingly contact the marginal portion of the upper surface of said bottom wall, delivery means constructed and arranged to deliver batch glass-forming ingredients to said bottom wall, and to maintain a supply of said ingredients along said bottom wall and in contact with said marginal portion, said delivery means being constructed to provide a height of said batch sufficient to prevent molten glass from flowing laterally.

13. In a glass melting furnace composed of a bottom wall and upstanding connected side walls defining a chamber and said chamber having included means associated therewith to heat and fuse glass-forming ingredients introduced therein, the improvement which comprises scraper means adapted to abradingly contact the upper margin of the inner surface of said side walls, a conduit for coolant situated proximate said scraper means and said upper margin, and a movable element located just inward from said side walls and slightly above the horizontal plane of said conduit whereby oscillations of said element urges ingredients charged to said furnace downwardly.

14. A glass melting furnace comprised of a refractory bottom and plural refractory side walls which together define a melting chamber, means for feeding batch into said melting chamber, means for heating said batch in said melting chamber to melt and maintain a body of molten glass therein, means in said melting chamber for withdrawing molten glass from said body, chilling means disposed about the periphery of said melting chamber on the side walls thereof and extending proximate the inner wall surface of said chamber, a reciprocable scraping member mounted for frictional contact with the inner surface of said side wall and, in association with said chilling means, for forcing batch downwardly and into the melting chamber.

15. In a glass melting furnace wherein refractory bottom and side walls together define a melting area and including means for feeding batch into said melting area, means for heating said batch to melt it and maintain a body of molten glass and means for withdrawing molten glass from said body, in combination therewith, a chilling means disposed on the side wall of the melting area below the batch level in the melting area and including an outer surface area that extends inwardly proximate the inner wall surface which defines the periphery of the melting area, a reciprocable scraping member moving closely along the said surface area of said chilling means, and means for actuating said scraping member to move it reciprocatingly along said outer surface area, the chilling means and reciprocable scraping member cooperating to control the peripheral level line of the glass in the melting area.

16. In a melting furnace, the combination of a furnace side wall, a chilling means on said side wall and including a chilling surface extending proximate the inner surface of said side wall, means connected to supply a cooling medium to said chilling means inclusive of its said chilling surface, a reciprocable member mounted for abrading contact with said chilling surface, and means for reciprocating said member along said chilling surface.

17. A glass melting furnace comprising:
a refractory bottom wall,
a refractory overhead crown including depending refractory walls at least one of which does not extend downwardly sufficiently to meet said bottom wall, thereby leaving an opening between said bottom wall and side wall,
burner means situated above said bottom wall in said crown,
a hollow linear conduit having an upper surface contiguous to said bottom wall and beneath and coextensive with said opening,
means for delivering and removing a coolant fluid to said conduit,
a plurality of hollow cone-like members, in aggregate, essentially filling said opening excepting a region just above said upper surface, said cone-like members being located with their central axis extending inwardly and downwardly with respect to said bottom wall, said cone-like members each including a transverse flexible diaphragm defining a major interior chamber and a smaller exterior chamber which is essentially fluid sealed,
means for changing the pressure in said exterior chamber, whereby said diaphragm moves inwardly and outwardly on said cone axis,
opening means formed in said major chamber of each of said cone-like members for introduction of granular, glass-forming batch materials, and
a bar mounted for reciprocable abrading movement across said upper surface of said coolant containing conduit.

18. In a melting vessel for converting a solid to the liquid state, said vessel having a bottom wall and upstanding side walls defining a melting zone, the improvement which comprises a chilling element including a surface extending laterally along at least one side wall, said chilling element providing a temperature along said surface which is below the melting temperature of the solid, thereby limiting the depth of liquid along said side wall, a shiftable scraper means arranged for abrading contact with said surface of said chilling element, means for delivering solids proximate said side wall and chilling element, and means for urging solids downwardly along said side wall.

References Cited

UNITED STATES PATENTS

| | | | |
|---|---|---|---|
| 1,069,255 | 8/1913 | Heroult | 13—6 |
| 1,082,195 | 12/1913 | Helfenstein | 13—33 |
| 1,999,761 | 4/1935 | Howard | 65—335 |
| 1,999,762 | 4/1935 | Howard | 65—335 |
| 2,777,254 | 1/1957 | Siefert et al. | 65—324 |

DONALL H. SYLVESTER, *Primary Examiner.*

S. LEON BASHORE, G. R. MYERS,
*Assistant Examiners.*